United States Patent [19]

Bhat

[11] Patent Number: 5,764,961
[45] Date of Patent: Jun. 9, 1998

[54] PREDICTABLE DIVERSE DATA DELIVERY ENABLEMENT METHOD AND APPARATUS FOR ATM BASED COMPUTER SYSTEM

[75] Inventor: Kabekode V. Bhat, Naperville, Ill.

[73] Assignee: NCR Corporation, Dayton, Ohio

[21] Appl. No.: 624,337

[22] Filed: Apr. 3, 1996

[51] Int. Cl.$^6$ .................................................. G06F 9/455
[52] U.S. Cl. .................................................. 395/500
[58] Field of Search ........................ 395/500, 182.18, 395/183.02, 200.49, 673; 364/551.01, 578; 370/231

[56] References Cited

U.S. PATENT DOCUMENTS

| | | | |
|---|---|---|---|
| 5,408,465 | 4/1995 | Gusella et al. | 370/231 |
| 5,483,468 | 1/1996 | Chen et al. | 364/551.01 |
| 5,506,955 | 4/1996 | Chen et al. | 395/183.02 |
| 5,550,982 | 8/1996 | Long et al. | 395/200.49 |

*Primary Examiner*—Kevin J. Teska
*Assistant Examiner*—Dan Fiul
*Attorney, Agent, or Firm*—Merchant, Gould, Smith, Edell, Welter & Schmidt

[57] ABSTRACT

A computer-implemented performance modeling system incorporating data structures and algorithms representing a complex of ordered double buffering systems and buffer management schemes for delivery of diverse data in multimedia communication systems is disclosed. The modeling system enables the diverse data to be delivered from a disk subsystem connected to a diverse data enabled (DDE) server computer to client computers via the server computer and ATM networks in an efficient and predictable manner. A performance model for the ATM network based DDE server system is created that predicts the number of streams the entire system can dynamically support. The performance modeling system enables open system DDE servers, clients and switches to guarantee delivery of information to users dynamically, without buffer overflow or starvation.

9 Claims, 3 Drawing Sheets

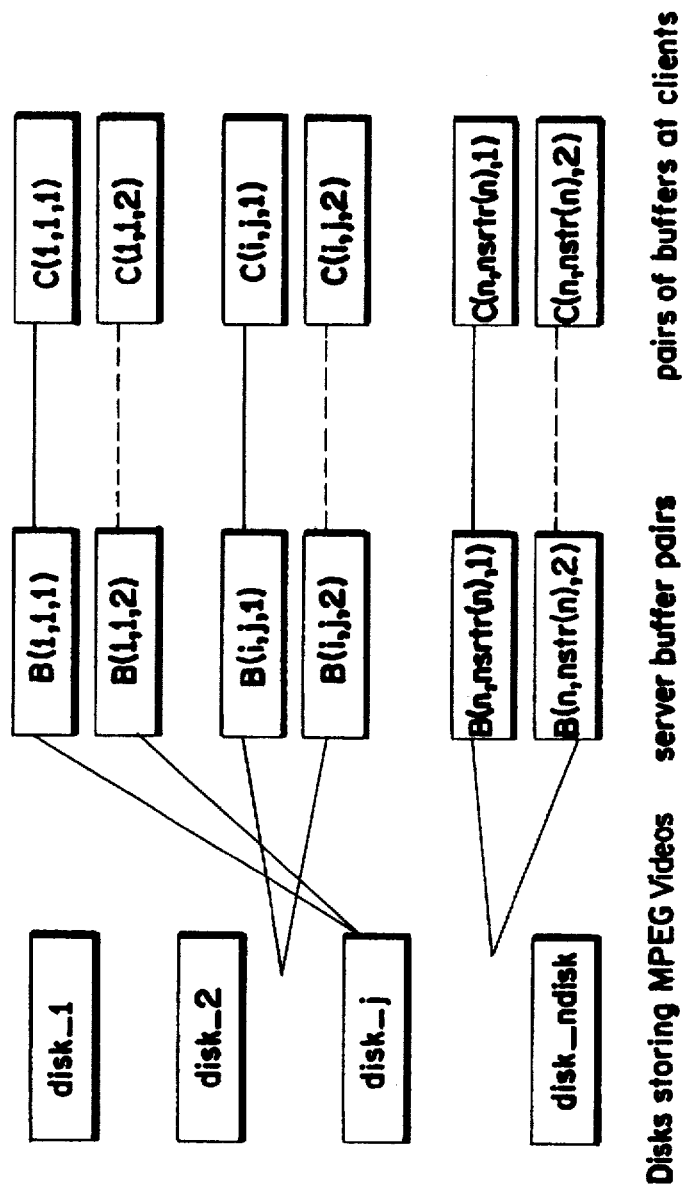

PREDICTABLE DIVERSE DATA DELIVERY ENABLEMENT METHOD AND APPARATUS FOR ATM BASED COMPUTER SYSTEM

BACKGROUND OF THE INVENTION

1. Field of the Invention

The present invention relates generally to computer communication systems, and more particularly to a method and apparatus for delivering stored continuous files for a mass storage computer subsystem to its local area or wide area communication ports.

The disclosures of copending U.S. patent application Ser. No. 08/627,192, entitled "Resource Management Method and Apparatus for Maximizing Multimedia Performance of Open Systems," filed on even date herewith, are herein fully incorporated by reference.

2. Description of Related Art

How to transmit multimedia (MM) or video or diverse data stored in a disk subsystem attached to a server computer to a number of diverse users (in terms of Mbit rate data demand) connected to the system via ATM networks, efficiently and at a rate as needed by the user of the data continues to be a problem in the industry. Current open system servers do not have the capability to guarantee data delivery for new service requests, dynamically. This either leads to observable failure of service to one or more diverse data users or to substantial underutilization of system resources. Failure of service to the users results in customer dissatisfaction, and underutilization of system resources results in reduced performance/price ratio. The data transmission within an MM system may involve temporary storage in buffers, processing and transfer of data. A "stream" is a finite collection of sequential data (representing a video or audio or text or a combination thereof) that is being transmitted from a source to an intended destination within the multimedia communication system. Storage, processing and transfer of multiple multimedia streams such as those associated with movies or video clips pose new challenges to multimedia servers. The multimedia server must be able to manage and deliver multiple multimedia data streams simultaneously, where each stream needs to deliver information at a predetermined rate that may range from 1.5 Mb per second to 8 Mb per second. They need increased I/O bus bandwidth, enhanced processor memory interconnection bandwidth and sophisticated algorithms and software.

The ability to provide a service to customers as agreed and meeting their expectations is vital for success in any competitive business, including those involving communication and computers. In the communication arena, ATM technology by design provides quality of service (QOS). In the ATM technology, QOS is defined by guarantees on the bandwidth, loss of frames and delay to the network customers.

Although considerable research has been done in specific MM areas, the issue of how to provide "guaranteed" QOS (GQOS) in MM communication involving both computers and communication networks, has not been adequately addressed. It has been suggested in the MM art that one way in which to achieve GQOS is to incorporate an admission control strategy or function into the MM system, wherein new jobs will be turned down based on some type of criteria. However, such criteria has not, to date, been adequately defined in the art.

Computers in general are typically configured to accurately complete specific data processing tasks within an average response time, acceptable to its customer. Understanding the application processing scenario on the computer system, the performance, capacity and reliability characteristics of the major system components under the processing scenario—are adequate to design a good computer configuration meeting those needs. However, in MM computing, where certain data types such as video or audio must be delivered to the clients at a rate required by them, or to meet a specified deadline, the traditional computer configuration design approach is inadequate. A meaningful definition for QOS in MM communications must encompass the entire solution architecture rather than be limited to disk I/O or server or network. An MM customer desires: (a) response time for the continuous media requests to be bounded by a reasonable time; and (b) service for all admitted clients to be continuous for a period, with the requested quality in terms of M bit rates, delay and jitter. The present invention addresses the above described concerns and deficiencies of prior art MM communication systems.

The QOS for multimedia is determined by the response time and data delivery rate at the client. This is influenced by the processing scenario within the system incorporating the information source (e.g., a disk subsystem), network connections from other servers or clients, and the software. GQOS within a system is possible under the following conditions:

(1) the system is configured properly, meeting the customer's stated needs;

(2) admission control is based on current values of (monitored or model predicted) performance parameters for key components and the impact of new request admission on the QOS of new and existing requests; and (3) protection against viruses and misbehaving applications whose resources demands hurt QOS for all.

An obvious solution is to design servers that provide GQOS as an integral part of their design, and couple them with the ATM network that has QOS built in by design so that the entire system provides GQOS for multimedia customers. Such proprietary real time computers, however, are more expensive than off-the-shelf open systems. Further, users might prefer emerging open system computers that include symmetric multiprocessing, highly parallel architectures, operating systems, databases, high availability, and other technologies. Therefore, an approach that enables an open system server to support the GQOS attribute, is of great value.

Admission control has received considerable attention in the art. One proposed approach has provided an observation based method that assumes that the average amount of time spent in retrieving a media block from disk does not change significantly even after the new client is admitted by the server. Requiring a disk subsystem operating under this assumption, however, is a major restriction. According to another approach using a statistical admission control algorithm, distributions of access times of media blocks from disk and play-back requirement of streams are used to provide a statistical service guarantee to each client. This method makes the unacceptable compromising assumption that occasional loss of media information is acceptable, and that a percentage of frames that may lead to brief distortions in play-back can be discarded.

The present invention addresses the above shortcomings of prior art server communication systems. The methodology presented by the present invention is general, and is useful in designing rapid prototyping and configuring multimedia information servers, and provides a basis for realizing GQOS in multimedia communication systems.

SUMMARY OF THE INVENTION

To overcome limitations in the prior art discussed above, and to overcome other limitations that will become apparent upon reading and understanding this specification, the present invention discloses a computer-implemented performance modeling system incorporating data structures and algorithms representing a complex of ordered double-buffering systems and buffer management schemes for delivery of diverse data such as video strips and movies, from a disk subsystem connected to a server computer, to client computers by means of the server computer and ATM networks in an efficient and predictable manner. According to one aspect of the invention, a model for performance analysis of a diverse data enabled (DDE) server for server-centric and peer-to-peer scenarios is created. The model predicts the number of streams the entire system can dynamically support. According to one aspect of the invention, in a server-centric case, data stored in disks is managed and routed through the server memory to desk top clients via a PCI bus, a PCI bus—ATM adapter board and an ATM network. According to another aspect of the invention, in a peer-to-peer case, data from the disks is managed by the server but is routed directly from the disk host adapters to the ATM adapter boards over the PCI bus. The invention includes algorithms for processing the data within the system and means methodology for delivering the data in a timely dynamic manner to the client, as needed.

The models created by this invention enable determination of performance metrics including the minimum number of simultaneous video streams (at a specific bit rate) and the response time for a typical user command to be determined for each of the modeled scenarios. According to one aspect of the invention, modeling of the processing scenario is performed using queuing networks. According to a further aspect of the invention, the modeling process employed by this invention accounts for parallelism existing within the multimedia system architecture. According to yet a further aspect of this invention, the performance metric determinations for a multimedia communication system determined by this invention enable the location of bottlenecks and architectural limitations in the system and enhance design, redesign, configuring and prototyping of DDE server systems. According to yet a further aspect of the invention, the modeling methodology of this invention provides a basis for realizing guaranteed quality of service (GQOS) for DDE server systems. These and other aspects of the invention will become apparent to those skilled in the art from a review of the following detailed description of preferred embodiments and applications of the invention.

BRIEF DESCRIPTION OF THE DRAWING

Referring to the Drawing, wherein like reference designations represent corresponding parts throughout the several views:

FIG. 3 diagrammatically illustrates the overall data flow for a second portion of the multimedia system of FIG. 1.

DETAILED DESCRIPTION OF THE PREFERRED EMBODIMENT

Figure 1:
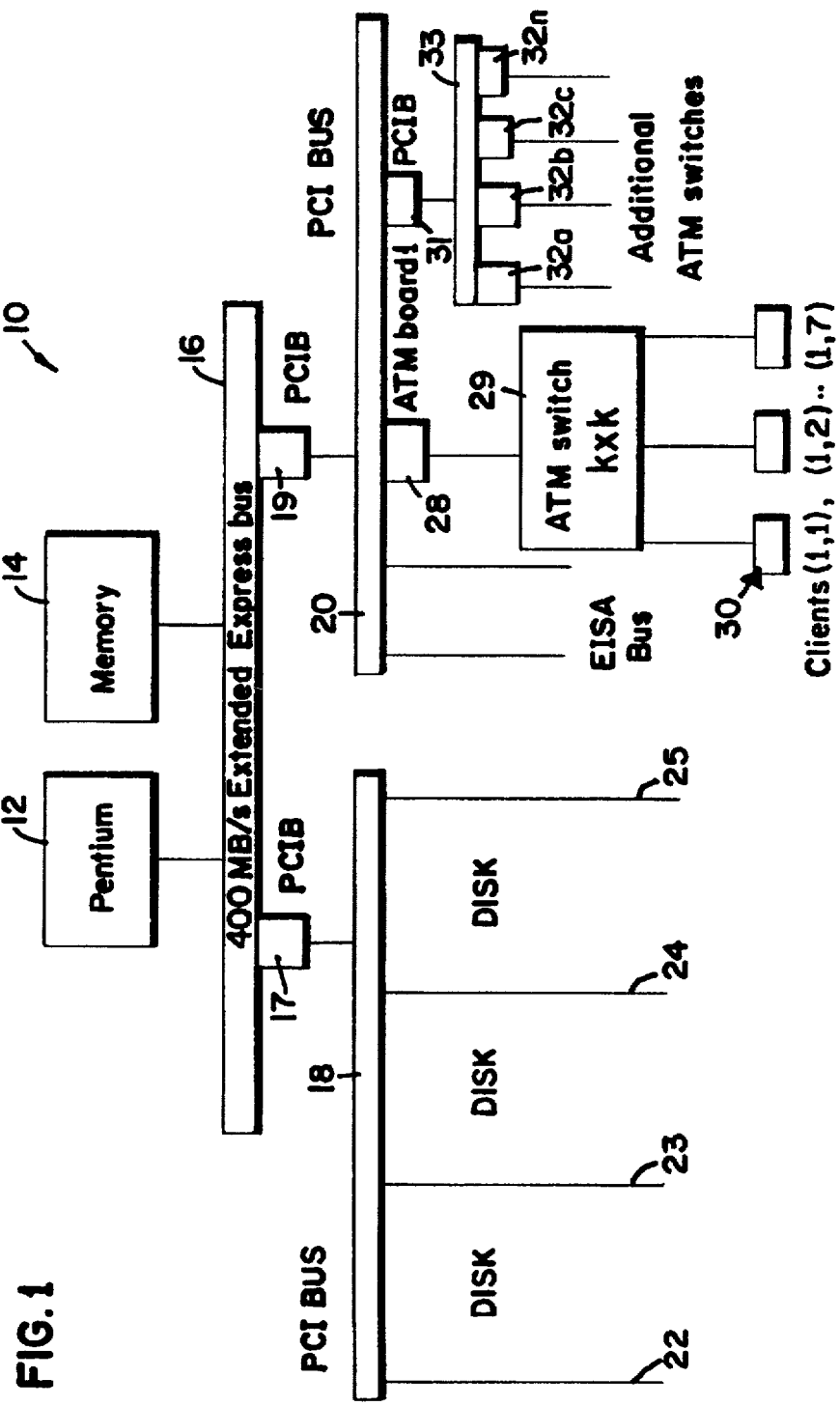
FIG. 1 diagrammatically illustrates one embodiment of a multimedia system in which the present invention can be applied.

The technological developments and human urge for enhanced productivity and quality of life are placing new demands on computers and communications technologies. The number of users of these technologies around the world have been growing and so are their applications. Specifically, user's expectations on the speed at which they can communicate and the volume of data they need have been soaring demanding high bandwidth I/O for computers and low latency GQOS networking capabilities for computers.

A synchronous Mode Transmission (ATM), a connection-oriented packet-like switching and multiplexing technology offers simplicity and flexibility within multimedia communication network. Instead of dedicated physical channels, it provides virtual channels that facilitate better utilization of resources at low latency, high capacity and scalable data transfer rates. The data is carried by 53 byte cells where the first 5 bytes are for header data and the remaining are for payload information. For a more complete description of such process, the reader is referred to R. S. McKinney and T. H. Gordon, "ATM for Narrow band Services", *IEEE Communications Magazine*, Vol 32, No. 4, PP 64–72, April 1994.

The B-ISDN Protocol Reference Model contains user, control and management planes. The physical layer (PHY) provides for the transport of PHY service data units (PHY_SDUs) between 2 ATM entities and the ATM layer provides for the transport and sequential transfer of fixed-size data units between a source and destination(s) with an agreed quality of service (QOS). The two layers are common to all services and user and control planes. By performing the necessary functions such as segmentation and reassembly of data units for mapping into fixed length ATM cell payloads, the AAL adapts the services provided by the ATM layer to the services required by different service users. For a more detailed explanation, the reader is referred to the previously cited McKinney article and further to T. Suzuki, "ATM Adaptation Layer Protocol", *IEEE Communications Magazine*, Vol 32, No. 4, PP 80–83, April 1994. AAL functions are service specific.

Principles of the present invention will be developed herein with reference to a specific preferred embodiment server system, that of the open communications server manufactured by AT&T under its Phoenix label. A similar analysis and modeling of a constant rate flow system based on the AT&T Model 3416 multimedia server is described in the article: K. V. Bhat, "Performance Modeling and Analysis for AT&T 3416 based Multimedia server Architecture", in *Proceedings of International Conference on Telecommunications* 95, April 1995. The following will analyze the performance of an ATM network based AT&T Phoenix server on video on demand (VOD) applications. VOD is an important application for diverse data servers since these servers are meant to support video, audio, text, skills and other objects. A VOD application is chosen in view of the data path bandwidths and latency demands it places on the computer and communication systems in terms of data delivery requirements such as the rate, latency and quality. By extending the model and methodology presented in the analysis of the model 3416 server architecture, described in the Bhat article, the maximum number of concurrent clients supported on server-centric and peer-to-peer configurations for the AT&T Phoenix server with ATM network (adapter cards, switches and lines) can be determined. The model and methodology presented here can be used in other applications that are special cases of the ones considered here. Throughout this analysis it is assumed that each stream must read data from disks.

In the following discussion, the Phoenix server architecture and a high level view of the entire system are presented.

Metrics for measuring performance and capacity, the VOD processing scenario on the server-centric architecture and the model for determining the number of simultaneously active clients supported by the architecture are presented. A model is then developed for estimating the number of streams supported by different configurations of Phoenix system.

The models and the framework developed by this invention can be used for performance and bottleneck analysis, competitive system design, configuration design and management for VOD server systems and DDE server systems in the context of a ATM networking.

This invention enables the realization of a diverse data (video, movies, audio, text) enabled server. Such server is realized through the use of novel software data structures and algorithms (processing scenario) that work on any bus based computer system incorporating one or more disk subsystems, and one or more ATM (a synchronous transmission mode) networks or any other high bandwidth, low latency network connected to a number of client computers in a predictable fashion. The advantages of the methodology presented by this invention are: (1) it gives an end-to-end solution to the problem rather than only from a subsystem view; and (2) it has the capability to handle diverse data types in terms of bit rate needs of the clients and can potentially handle larger numbers of clients.

The AT&T Phoenix DDE Server

The Phoenix server shown at 10 in FIG. 1 is a symmetric multiprocessing computer with 1-4 Intel Pentium processors, generally indicated at 12, having memory 14 that use a single 400 MB/second processor-memory EEX bus 16 that is connected to a pair of PCI buses 18 and 20 via PCI bridges 17 and 19 respectively. The PCI bus 18 supports 4 PCI adapter boards 22-25. The PCI bus 20 can support 2 PCI boards and 2 EISA boards for connecting a variety of I/O devices. A total of 8 I/O slots are supported in an entry level Phoenix configuration. More I/O slots can be obtained by adding PCI buses using PCI bridges. As illustrated in FIG. 1, the first PCI board slot of PCI bus 20 is filled with a first ATM board 28 which is connected by means of an ATM switch box 29 to a plurality of client computers generally indicated at 30. In the preferred embodiment, each ATM board and switch supports seven clients number 1-7. An integer pair (i,j), where i stands for the ATM board number and j stands for the client number within the group of clients serviced by the ATM board i, uniquely identifies a client in the system. For example, that client identified by the integer pair (1,2) in FIG. 1, is the second client of seven supported by and connected to the first ATM board 28. The second PCI board slot of PCI bus 20 serves additional ATM boards generally indicated at 32 through a PCI bridge 31 and a third PCI bus 33. The additional ATM boards 32 are connected through corresponding ATM switches (not illustrated) to a plurality of clients in the same manner as that described with respect to clients 30 connected to the ATM switch 29. The labeling and identification scheme for the various clients, boards, buses and the like of the server network is described in more detail with respect to development of the algorithm usable for implementing an admission control strategy or function for the system, in the cross-referenced copending U.S. patent application Ser. No. 08/627,192, entitled "Resource Management Method and Apparatus for Maximizing Multimedia Performance of Open Systems," filed on even date herewith, and fully incorporated by reference herein to the extent that any of the disclosures of my copending application are required to support this application.

In the following discussion and analysis, models for performance analysis of the Phoenix server will be evaluated for both server-centric and peer-to-peer scenarios. In general, the data stored in disks in the server-centric case is managed and routed through the server memory to the desk top clients by way of the PCI bus, PCI bus-ATM adapter board and ATM network. In the peer-to-peer case, the data from user disks is managed by the server, but is routed directly from the disk host adapters to the ATM adapter boards over the PCI bus(es), ATM network and the desk top clients.

In the server-centric processing architecture, large amount of data is stored and retrieved from the disks and moved into the clients via the server memory and ATM network. The major traffic load on the system bus is due to the disk I/O the ATM network I/O. In Phoenix system, one of the PCI buses can be dedicated for the disk I/O and the other one for ATM network I/O (and other I/O). Use of separate I/O buses for the disks and network I/O is conceptually simple and has advantages over using a single system bus in terms of system performance. The Phoenix sever also can be configured in other ways to partition the continuous media applications on one of the PCI buses and the business critical application on the other, and so forth.

Growth in terms of number of clients supported by the system is achieved by providing the OC-3 connections of the ATM boards respectively to a switch that connects to a number of client PCs or work stations or other devices. If more connections are desired than that provided by a single switch, either a larger switch is used or additional switches are used via the OC-3 ATM adapter card on the PCI bus as shown in FIG. 1.

The Server-Centric Processing Scenario and Performance Model

A customer perceived system performance metric is the mean response time in seconds elapsed from the instant a key command (e.g., play a video strip) is given to the instant the first picture begins to appear at the video screen for a given number of active users within the system. A measure of the VOD server system capacity is the number of users the system supports at a given level of response time. The lower the number of streams (of same bit rates), the lower is the response time for a typical command of an user.

Let there be n ATM OC-3 adapter boards in the server. These boards are ordered as $\{1 \leq, \leq n\}$. Let nstr(i) denote the maximum number of simultaneous streams, possibly of different bit rates supported by the i-th board. Table 1 gives the notations and model parameters used in this specification. The unit for all delays and latencies are in seconds unless noted otherwise.

TABLE 1

| Model Parameters and notations. | |
|---|---|
| Notation | Description |
| rate(ij) | Data consumption rate (Mbit per second) by client(i,j) for stream Sij. |
| nstr(i) | Maximum number of streams associated with i-th ATM adapter card. |
| buffer_size(i,j) | Size of buffers at server and client for the stream $S_{ij}$ in MB |
| tseru | Server CPU service time in seconds for upstream processing. |
| tserd | Server CPU service time in seconds for downstream processing. |
| tserap | Server CPU service time in seconds for application processing. |

TABLE 1-continued

Model Parameters and notations.

| Notation | Description |
|---|---|
| $U_{ser}$ | Server CPU utilization in the server-centric processing scenario. |
| Uscsi | Utilization of fast and wise SCSI-2 bus that host disks at the upstream. |
| du | Number of fast and wide SCSI-2 adapters supporting upstream disks. |
| usp | Effective speed-up due to multiple fast and wise SCSI-2 buses at upstream. |
| ndisk | Number of disks in the disk subsystem. |
| video_size | Giga Bytes of MPEG data for a video. |
| disk_size | Giga Bytes of MPEG data for a video. |
| B(ij,1), B(ij,2) | The (i,j)-th server RAM buffer pair of size = buffer_size(ij), i=1, 2,n; j=1,2, ..nstr(i). |
| C(ij,1), C(ij,2) | Two buffers each of size = buffer_size at client(ij), i=1, 2, n; j=1,2, ..nstr(i). |
| x | Response time cut off for a key user command. |
| $T_{ufill}$ | Average delay for filling a RAM buffer from disk. |
| $T^\wedge_{ufill}$ | Average effective delay for filling a RAM buffer from disk. |
| $T_{seek}$ | Average seek delay for disk. |
| $T_{user}$ | Server CPU delay for filling a RAM buffer from disk. |
| $T_{scsi}$ | Fast and wide SCSI-2 delay for filling a RAM buffer from disk. |
| $T_{mpci}$ | PCI bus delay for a request or message. |
| $T_{dfill}$ | Average delay for copying RAM buffer to ATM adapter card. |
| $T_{dser}$ | Server CPU delay for copying RAM buffer to ATM adapter card. |
| $T_{meisa}$ | Delay for a message at the EISA bus. |
| $T^\wedge_{dfill}$ | Average delay for copying RAM buffer to ATM adapter card. |
| $T_{serap}$ | Server delay for application processing per buffer_size. |
| $T_{atmc}$ | Delay at the ATM adapter card. |
| $T_{ethernet}$ | Delay in seconds at the ethernet & EISA bus for request or message. |
| $T_{diskioatm}$ | Delay for copying SCSI-2 disk buffer to buffer at the ATM adapter card. |
| R | Average response time for the customer key command. |

Let $\{_{ij}: 1 \leq, \leq n; 1 \leq j \leq nstr(i)\}$ be the set of concurrent streams supported by the server where, $S_1$ij is the j-th stream in the i-th ATM adapter board. The stream $S_{ij}$ terminates at the client(ij) where the video is displayed at rate(ij) Mbit/second. Note that in the ATM network architecture considered here, there is only one path from a client to the server. The dominant application processing scenario in the architecture is as follows.

1. A user at the client (ij) requests the server (either via ATM network or over the ethernet, EISA bus and PCI bus) for a specific video clip available in disk storage at rate(ij) Mbit/second.
2. The server recognizes the request, routes it through the admission control resource allocation algorithm (implemented in the server's middleware as described in the incorporated cross-referenced patent application) to ensure that the request can be serviced. If it can meet the quality of service requirements of all existing clients including the new one, the server reads the data from correct disk(s) into the appropriate server buffer group; otherwise the request is given a "busy tone".
3. The server operating system data delivery manager (DDM) component builds the next chain of buffer pointers for assembling the next AAL5 packet multiplexing the appropriate data buffers associated with the currently active streams including the new request(s).
4. The DDM notifies the i-th ATM adapter board to DMA transfer the next AAL-5 packet sequence. The board's segment and reassembly (SAR) chip set segments and reassembles the packet into standard ATM cells and transmits them over the 155 Mbit/second OC-3 line into the ATM switch. The server buffers associated with the buffer chain pointers are marked ready to be filled with the next pieces of data if any by the server.
5. The switch sends the ATM packet sequence to appropriate destination clients, client (i,q), q=1,2, . . . nstr (i) via 25 Mbit/sec ATM connections and ATM card interface to the clients.
6. A finite number of concurrent clients generate load on the processors, buses and the disk controllers and ATM network as they use the system.

Associated with each stream $S_{ij}$, the server RAM has a pair of buffers (B[i,j,1], B[i,j,2]) for implementing a double buffering scheme. Here when one of the buffers is being emptied by a DMA operation from the ATM adapter board i, the other may be filled by the disk subsystem with the next chunk of data from the stream. The server is assumed to fill the empty buffers with the next relevant data from disk subsystem in a round robin fashion so that when a buffer is emptied of data and additional data is needed, the other would be ready for emptying. If this were not to happen, client(ij) will see an interruption in service. Let period be the maximum time interval in seconds that the server can take to complete a round of filling the set of empty buffers without starving any of the clients. The size of each of the buffers associated with $S_{ij}$ denoted by buffer $_{13}$ size[ij], is given by period×rate[ij]/8.

Figure 2:
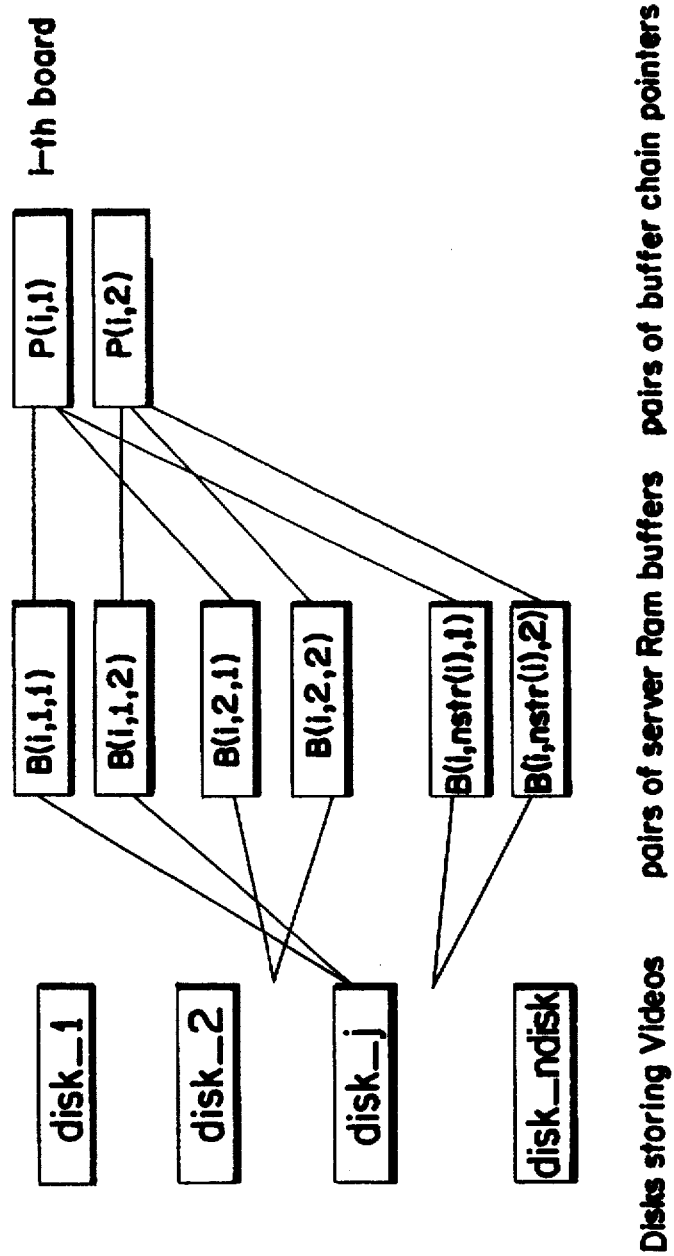
FIG. 2 diagrammatically illustrates the overall data flow for a first portion of the multimedia system of FIG. 1.

The data associated with a specific stream is read from the disks via the bus hierarchy (SCSI bus, PCI bus, PCI bridge, EEX processor-memory bus) into the corresponding empty server RAM buffer. This constitutes the upstream processing, as described in the previously referenced Bhat paper. Data from filled buffers in the server RAM are multiplexed and assembled into an AAL5 packet on the fly and transmitted via the ATM network. This part of the scenario is downstream processing. Double buffering scheme is used at both upstream server RAM and downstream clients RAM. Note that corresponding to a stream at the upstream, there is exactly one stream at the client at the downstream and vice versa. The overall data flow, for the buffers at the server and ATM boards is as shown in FIG. 2, where only the i-th ATM adapter card dual buffer chains are shown. The data flow for the buffers at the DDE server memory and clients is as shown in FIG. 3.

An application requirement is that the system including the server and the network should simultaneously feed all active clients with data at the rate the clients need so that no client starves and no data overflow occurs in any buffer within the entire system. This implies that for each j=1, 2, . . . . nstr(i), before the currently being worked downstream buffer C(i,j,1) is completely empty, the buffer C(i,j,2) should be filled with the next piece of data from the server buffer B((i,j,2) via the ATM network. Further, it also implies that the corresponding upstream server buffer B((i,j,2) should be filled from the disk subsystem when the downstream buffer C(i,j,2) needs the next data chunk. Management of upstream buffers and buffer pointer chains is a key server software function necessary to make this scheme work correctly. In addition to the correctness of the algorithms executing on the server, the server (hardware, software and application) system must be capable of reading the right data from the disk subsystem over the bus complex into server buffer at least at the same rate as that needed by the respective clients. A client or ATM board is said to be streaming if it is fed with data at a rate that does not produce any buffer starvation in these components.

(a) The Upstream Model

A necessary condition for the data pump to work correctly for a specific stream is given next. Assertion 1. The upstream rate for a specific stream $S_{ij}$ must be at least equal to rate(ij).

For configuration 1, we assume that a disk stores all the MPEG data for a video and the disks are distributed equally on the SCSI-2 buses. The worst case total delay for filling a server RAM buffer from the disk is:

$$T_{ufill} = T_{user} + T_{upci} + T_{scsi} + T_{seek} \quad (2)$$

The values for $T_{user}$, $T_{upci}$ and $T_{scsi}$ are obtained from a M/M/1 queuing model [6]:

$$\text{latency} = \frac{\text{service\_time}}{(1 - \text{utilization})} \quad (3)$$

where, latency is the response time for a station, service_time is the time for servicing the request at the station and utilization is the arrival rate times the service time for the station. Next we illustrate the application of (3) for computing $T_{user}$, $T_{upci}$ and $T_{scsi}$.

(b) The Server Subsystem Model tser, the CPU service time for shipping a buffer_size(ij) of data of the stream $S_{ij}$, is the sum of the CPU service times for upstream processing and downstream processing. For the life of the stream of (1024×video_size/rate(i,j)) seconds, there is an added service time of tserap for application processing. Thus the average server utilization due to processing of $S_{ij}$ alone is:

$$\frac{tser(i,j) \times rate(i,j)}{buffer\_size(i,j)} + \frac{tserap \times rate(i,j)}{1024 \times video\_size} \quad (4)$$

$U_{ser}$, the server utilization corresponding to all active streams for the server-centric case is given by:

$$U_{ser} = \sum_{i=1}^{i=n} \sum_{j=1}^{j=nstr(i)} \left( \frac{tser(i,j) \times rate(i,j)}{buffer\_size(i,j)} + \frac{tserap \times rate(i,j)}{1024 \times video\_size} \right) \quad (5)$$

Since the service time for the upstream processing of a single buffer at the server CPU is tseru(ij) using equation (3) we get:

$$T_{user} = tseru(i,j)/(1 - U_{ser}) \quad (6)$$

(c) The PCI Bus Model

Since the buffer_size of data visits the PCI bus-1 once during the upstream processing in the server-centric case, the resulting average bus utilization is rate(ij)/bw_pci. For all active streams, $U_{pci}$, the PCI bus utilization is:

$$U_{pci} = \sum_{i=1}^{i=n} \sum_{j=1}^{j=nstr(i)} \frac{rate(i,j)}{bw\_pci} \quad (7)$$

The PCI bus service time for shipping a buffer_size of data over PCI bus in upstream processing is (buffer_size/bw_pci) seconds. Using this service time and (7) in equation (3) we get:

$$T_{pci} = (buffer\_size/bw\_pci)/(1 - U_{pci}) \quad (8)$$

(d) The Disk Subsystem Model

We assume that ndisk disks each of size disk_size GB are distributed over du SCSI host adapters that are connected to PCI bus. The data throughput rate required is equally shared by the du SCSI buses. The SCSI bus service time to ship a buffer_size of data is given by buffer_size/bw_scsi seconds. The utilization of a SCSI bus denoted by $U_{scsi}$ is given by:

$$U_{scsi} = \sum_{i=1}^{i=n} \sum_{j=1}^{j=nstr(i)} \frac{rate(i,j)}{bw\_scsi \times du} \quad (9)$$

Thus in view of equation (3) we have:

$$T_{scsi} = (buffer\_size(i,j)/bw\_scsi)/(1 - U_{scsi})$$

(e) Effect of Parallelism

We also preferably account for the possible parallelism (pipe lining and look ahead processing features) in implementing the upstream scenario. Implementation of large disk cache eliminates $T_{seek}$ for all sequential disk reads except the first one and DMA facilitates parallelism between CPU processing and data transfers between disks and CPU RAM via SCSI and PCI buses. Further, data transfers from multiple disks and those from multiple SCSI host adapters across the PCI can be concurrent. These features render $T_{ufill}^{\wedge}$ the effective delay for transfer of data from the disk subsystem to server RAM to be less than that given in (2). Next determine $T_{ufill}^{\wedge}$. Let N denote the maximum number of streams supported.

Clearly $$N = \sum_{i=1}^{i=n} nstr(i).$$

For simplicity assume that each of these streams have av_rate Megabytes per second and use server RAM buffers of size buffer_size. Since the data visits the PCI bus only once during upstream processing, no speed up for the component $T_{pci}$ is possible. Since the memory bandwidth is greater than bw_pci, for du>1, usp, for $T_{scsi}$ due to concurrency at the SCSI disk subsystem is:

$$usp = \text{Minimum}\{bw\_pci/bw\_scsi, N, du\} \quad (11)$$

Further, the CPU processing and data transfer from the disk subsystem to server RAM (via SCSI-2 and PCI buses) is done in parallel when N>1. In order to quantify the real time that can be saved, let $P_u$ denote the probability that the CPU does upstream processing while data is transferred from the disk to the server RAM (under multiprogramming situation). $P_u$ is given by the product of the CPU utilization for upstream processing of all the concurrent streams and the utilization of the highest utilized bus (PCI or SCSI-2) on the data path from the disk to the server. That is, $$P_u = \left( \frac{N \times tseru \times av\_rate}{buffer\_size} \right) \times \text{Maximum} \left( \frac{N \times av\_rate}{bw\_pci}, \frac{N \times av\_rate}{bw\_scsi \times du} \right)$$

The CPU real time delay that occurs while a buffer_size of data is transferred to server RAM from disks at the upstream processing is $P_u \times T_{user}$. The CPU component delay that occurs in addition to $T_{upci}$ and $T_{scsi}$/usp in computing effective delay $T_{ufill}^{\wedge}$. Thus we have:

$$\hat{T}_{ufill} = (1 - P_u) \times T_{user} + T_{pci} + \frac{T_{uscsi}}{usp} \quad (13)$$

With each disk supporting a single stream, the following inequality must be satisfied in order that there is no starvation at any client(i,j).

$$\frac{\text{buffer\_size}}{T_{ufill}} \geq av\_rate \quad (14)$$

Note that if each disk were to concurrently support m streams at the rate of av_rate MB/second, then the following inequality must be satisfied in order that there is no starvation at any of the corresponding m clients.

$$\frac{\text{buffer\_size}}{T_{ufill}} \geq m \times av\_rate \quad (15)$$

(f) Analysis of the Downstream With ATM Network

Next we explore the impact of using ATM network at the downstream on:

1. the overall delay at the network
2. the loading of server PCI bus
3. delays at the server itself.

We assume that there are n ATM adapter boards. Note that the delays experienced by an ATM packet within the network is less than 0.2 milliseconds. The utilization of the processors at the switch and the ATM boards at the switch are expected to be low by design and the queuing delays here are negligible. The network guarantees quality of service by design.

Consider the steady state situation when all clients are streaming. Each ATM board serves its active clients simultaneously via the (kxk) ATM switch. If the server and disk systems were able to stream all the n ATM boards then there would be no starvation for data at the clients served by the ATM cards. Assume that the server sends data to ATM board 1, 2, 3, . . . n in a round robin fashion and the buffer C(1j,1) at the client(1j) has been marked ready to be emptied by the client(1), for all 0<j≦nstr(1). The client(1) for all 0<j≦nstr (1) empties the filled buffers in exactly buffer_size(1j/ rate(1) seconds and during that period, if the system were to function properly, the server must fill the set of buffers: {C(p,q,1): p=2,3,4,n; q=1,2,3 . . . nstr(p)} and {C(1j,2): j=1,2,3,4, nstr(1)}. These buffers are filled concurrently by exploiting the parallelism in the ATM network. The time $T_{dfill}$ that elapses between a request for filling a client buffer and its completion is given by sum of the latencies that occur along the data path from the server memory to the client buffer and the server CPU time for processing an interrupt and setting up a write operation.

$$T_{dfill} = T_{dser} + T_{dpci} + T_{atmc} + T_{switch} + T_{atmc} + T_{dpci} + T_{client} \quad (16)$$

where $T_{dser}$, $T_{client}$, $T_{switch}$, $T_{dpci}$, and $T_{atmc}$ are the latencies at the server CPU, client CPU, switch, PCI bus and the ATM board respectively. The latencies on the passive devices are deterministic and those at the server and client are determined by the queuing model.

The OC-3 connection from an ATM adapter card to the switch guarantees a transfer rate of 155 Mbit/second and that from the switch to a client at 25 Mbit/second. Thus the delay experienced by an ATM cell (of size 53 Bytes) during its move from ATM adapter card to the switch is 53×8/155, 000,000 seconds or 2.74 microseconds. The delay for an ATM cell from the switch to the ATM adapter at the client is 16.96 microseconds. Assume 6 clients per switch so that none of the ATM links from the switch to the clients will starve for lack of data which is a pessimistic case. Then the total delay experienced by an ATM cell over the ATM connections alone is 19.7 microseconds. The ATM switch is assumed to be capable of switching s millions of switching operations per second. With s=2, the switching delay at the ATM switch per cell is 0.5 microsecond. The delay at the ATM board (corresponding to several cycles at 30 Mhz clock rate) is of the order of microseconds. Under these conditions the delay experienced by an ATM cell would be well under 0.05 milliseconds.

The throughput of an ATM adapter card at the server and switch in terms of the actual MB/second of diverse data depends upon the AAL protocol used as well as any internet protocols used above the AAL protocol. The OC-3 guarantees a throughput of 155 Mbit/second of which only (48/ 53)×155(=140) Mbit per second corresponds to ATM cell payload. The ATM payload may also contain information pertaining to protocols used and therefore the effective MM data rate will be less. Assuming about 25% of data rate for AAL-5 protocol associated overheads, an estimate for the peak MM throughput rate is about 105 Mbit per second per ATM adapter board at the server.

Associated with each ATM board, there are two buffer pointer chain structures. A buffer pointer chain structure has pointers to the data buffers in the server RAM so that the ATM adapter board can set up a DMA operation to pull the multiplexed AAL-5 packet from the server RAM buffers. One of these structures has pointers to currently emptying server buffers of data associated with the streams serviced by the ATM board. The other one points to the respective server RAM buffers that are currently being filled from the disk subsystem. These structures are passed to respective ATM boards so that they can DMA the buffers of data and other headers in the right order and perform SAR function on those and ship 53 bytes ATM packets over the OC-3 channel bo the switch. The central issue here is how the server forms AAL-5 packets to feed the n ATM board so that none of the clients suffer from starvation for data when needed. The AAL-5 packets for each board are assumed to be formed in a round robin fashion so that at the end of each period, there will be a set of new AAL-5 packets for each board. The server delay for processing a buffer_size of data at the downstream is given by:

$$T_{dser} = tserd/(1-U_{ser}) \quad (17)$$

The following can be stated.

Assertion 2. A Necessary Condition For All the Clients Not To Starve is Given By:

$$N \times T_{dfill} \leq \text{buffer\_size} \times n/av\_rate \quad (18)$$

Note that although $T_{dfill}$ is the real time it takes to fill a client buffer from the server RAM, it takes only (N×$T_{dfill}$/n) seconds to fill all N buffers (one each of the N clients). This is because the buffers of clients associated with a specific ATM adapter board are all filled in parallel. Further there is parallelism between the server CPU processing and the data DMA transfer from server RAM buffers to ATM adapter card over the PCI bus. Next these parallelism are accounted for by taking the effective total delay for shipping a buffer_ size of data to the clients instead of $T_{dfill}$.

Let $P_d$ be the probability that the server CPU does processing concurrently with the data transfer from the server buffer to clients via the PCI bus. $T_{ufill}^{\wedge}$ is given by the following.

$$T_{dfill}^{\wedge} = (1-P_d) \times T_{dser} + T_{dpci} + T_n \quad (19)$$

where, $$P_d = \left( \frac{N \times tser \times av\_rate}{\text{buffer\_size}} \right) \times \left( \frac{N \times av\_rate}{bw\_pci} \right)$$

and $T_n$ is the end to end delay at the ATM network.

In order that none of the N clients starve at the downstream, the following condition should be met:

$$N \times T_{ufill} \leq \frac{\text{buffer\_size}}{av\_rate} \quad (20)$$

$$N \times \hat{T}_{ufill} \leq \frac{n \times \text{buffer\_size}}{av\_rate} \quad (21)$$

(g) Response Time For a User Request

Mean response time for a typical user request (e.g., play a video) is found by summing up the delays that occur from the time the request is entered into the system to the time the user sees the beginning of the response at the monitor. Components of the response time are the delays for the request communication to the server, transfer a buffer_size of data from disk to the server, application processing at server, the downstream processing and that at the ATM network. The mean response time R is given by:

$$R = T_{client} + T_{ethernet} + T_{mpci} + T_{serap} + T_{ufill} + T_{dfill} \quad (22)$$

Response times for other commands such as pause, fast forward, etc., can be similarly determined.

(h) Determination of the Number of Streams

Assuming that the server has adequate amount of RAM and CPU power so that these are not system bottlenecks, for a given disk subsystem with associated bus hierarchies and downstream I/O architecture, equations (1–22) are useful in determining N. N is obtained by solving the following constraints each of which only assures that a specific entity will not be a system bottleneck.

1. N<(Total server RAM-RAM needs for operating system and other applications)/(2×buffer_size). Assures that there is adequate server RAM.
2. ndisk>(Total data storage in GB needed for storing videos)/disk_size in GB. Adequate amount of disks for storing the number of videos desired.
3. N<ndiskx⌊disk_size/video_size⌋. Adequacy disk storage.
4.

$$N \times T_{dfill} \leq \frac{n \times \text{buffer\_size}}{av\_rate} \ .$$

Server needs to keep the clients streaming.
5.

$$N \times T_{dfill} \leq \frac{\text{buffer\_size}}{av\_rate} \ .$$

Avoids server buffer starvation at the upstream.
6. N<Minimum{measured bandwidth of PCI bus, sum of bandwidths of SCSI buses (upstream), nxOC-3 bandwidth x data content, sum of the bandwidths of ATM connections to clients)/av_rate. Data path hardware bandwidth limitation.
7. R<x. Mean response time for a key command must be within x seconds.
8. N<nx(k−1). Connectivity limitation at the ATM network.

Evaluation of Architectural Alternatives

We can now use the model to determine N, that can be supported on alternative configurations and processing scenarios. Once the value of N is determined, equations [5], [7], [9] and [22] respectively are used to find the utilization of key components (buses and CPU) and the response time.

Configuration 1. The disk subsystem consists of 28 disks distributed on 4 fast and wide SCSI-2 bus whose host adapter is connected to the PCI bus. We determine the value of N for this configuration.

Current value of the model parameters are as follows: bw_pci=80 MB/second, bw_scsi=13.2 MB/second, av_rate=1 MB/second, tserd=0.0331 second, tseru=0.0331 seconds. First we need to get the value of usp for determining $P_u$. For this, we use equations [2] & [3] to determine a conservative value for N (without completely accounting for parallelism in upstream processing):

$$T_{ufill} = \frac{33.1 \times 0.001}{\left(1 - \frac{2 \times 33.1 \times N}{1000}\right)} + \frac{\frac{1}{80}}{\left(1 - \frac{N}{80}\right)} + \frac{\frac{1}{13.2}}{\left(1 - \frac{N}{4 \times 13.2}\right)}$$

Substituting the above in inequality (20) and solving for N we see that N>4 and usp=Minimum{80/13.4,4,N}=4. Now using equation [13] with $P_u$=0, in inequality 20 we get:

$$\left( \frac{33.1 \times 0.001}{\left(1 - \frac{2 \times 33.1 \times N}{1000}\right)} + \frac{\frac{1}{80}}{\left(1 - \frac{N}{80}\right)} + \frac{\frac{1}{13.2 \times 4}}{\left(1 - \frac{N}{4 \times 13.2}\right)} \right) \times N \leq 1$$

The maximum integer value of N satisfying the above inequality is 8. Next we use equation [13] to account for the overlapping of CPU processing and the data transfers from the host adapter to the server RAM by DMA. Substituting N=8 in equation (12), we get $P_u$=(8×0.0331×8/(4×13.2)= 0.04. Using this value in equation [13] we get:

$$T^{\wedge}_{ufill} = \frac{1 - 0.04 \times 33.1 \times 0.001}{(1 - 2 \times 0.0331 \times N)} + \frac{\frac{1}{80}}{\left(1 - \frac{N}{80}\right)} + \frac{\frac{1}{13.2 \times 4}}{\left(1 - \frac{N}{4 \times 13.2}\right)}$$

Using inequality (20) we get:

$$\left( \frac{(1 - 0.04) \times 33.1 \times 0.001}{(1 - 0.0331 \times 8 \times N)} + \frac{\frac{1}{80}}{\left(1 - \frac{N}{80}\right)} + \frac{\frac{1}{13.2 \times 4}}{\left(1 - \frac{N}{4 \times 13.2}\right)} \right) \times N \leq 1$$

Solving the above, a maximum value of N=8 is feasible. Using the value of N=8, and equations [5], [7] and [10], respectively we get: $U_{ser}$=0.0662×8=0.53. $U_{pci}$=8/80=0.10. $U_{scsi}$=8/4×13.2=0.15

Note that the server CPU delay is a dominant component in the case considered. It would be interesting to see the impact of adding another CPU to the server on N. One way to account for addition of an identical CPU to the server is equivalent to cutting the tseru and tserd to half its value in the case of uniprocessor. Thus tseru=tserd=0.0165 seconds.

$$\left( \frac{16.5 \times 0.001}{\left(1 - \frac{2 \times 16.5 \times N}{1000}\right)} + \frac{\frac{1}{80}}{\left(1 - \frac{N}{80}\right)} + \frac{\frac{1}{13.2 \times 4}}{\left(1 - \frac{N}{4 \times 13.2}\right)} \right) \times N \leq 1$$

N=14 satisfies the above. We use N=14 in equation [12] and get $P_u$=(14×0.0165×14/(4×13.2)=0.06. Using this value in equation [13] we get:

$$\hat{T}_{sfill} = \frac{1 - 0.06 \times 16.5 \times 0.001}{(1 - 0.0331 \times N)} + \frac{\frac{1}{80}}{\left(1 - \frac{N}{80}\right)} + \frac{\frac{1}{13.2 \times 4}}{\left(1 - \frac{N}{4 \times 13.2}\right)}$$

Using the above equation in inequality 20, we get a feasible N=14.

Since at the downstream, an ATM adapter card can handle 6 clients without starvation, use of 3 ATM adapter cards and switches can support 14 streams with no starvation at the 14 clients.

As will be appreciated by those skilled in the art, alternative configurations can include variations such as increasing the number of CPUs, SCSI bandwidth enhancement and number of SCSI used, etc.

The Peer-to-Peer Architecture and System Capacity

The overall application processing scenario when peer-to-peer communication is implemented between the fast and wide SCSI-2 host adapters on the PCI bus and ATM adapter cards on the PCI bus 2 is as follows.

1. A client sends a request to the VOD server via ATM network and PCI bus 2 (or via Ethernet) to play a specific video that is available on the disk subsystem.
2. The VOD server recognizes the request, identifies and issues reads from the correct disk(s) into the buffer memory of the SCSI host adapter card.
3. The SCSI-2 host adapter transfers a buffer_size of data via PCI bus and ATM network into the buffer of the client. Buffer chain pointer are computed by the CPU and sent to the ATM adapter card which will DMA transfer appropriate data buffers from the SCSI host adapter and the ATM cells will be transmitted from the OC-3 connection to the switch as in the server centric case. The host adapter needs to have adequate RAM buffer in this case.
4. A finite number of clients use the system loading the processors, bus(es), the disk controllers and the ATM network.

As in the server-centric case, there will be 2 buffers on each SCSI host adapters so that when one buffer is being emptied at the rate(ij) the other may be filled by the disk subsystem. Although actual data does not go through the server RAM, the server manages the flow of data from the disk subsystem to the clients via the ATM adapter(s).

Assuming that all disks are supported on one of the PCI buses and all the network on the other, the PCI bus loading in peer-to-peer scenario is the same as that in server centric case but the load on the EEX bus is halved. The CPU memory loading is reduced as the streams do not get buffered at the server memory. CPU will need to process issues of disk reads based on the interrupts from the ATM boards.

The number of clients with a required data consumption rate of rate Mbytes per second that can be supported by the server in this case is determined by (among other constraints) the delay it takes to ship a buffer_size of data from the disk subsystem to a client buffer. This delay includes delays occurring at the disk subsystem SCSI-2 bus, PCI bus, EEX bus, server, ATM card at the server, ATM switch and ATM card at the client and PCI bus at the client. With the same assumptions as in section 2, $T_{seek}$ would be negligible. $T_{dsktoatm}$, the real time delay for sending a buffer_size of data from disk cache buffer to the client buffer without considering parallelism is:

$$T_{dsktoatm} = T_{dcser} + T_{scsi} + T_{pci} + T_{atmc} + T_n \qquad (23)$$

where, $T_n$ is the time delay experienced by the packet of size buffer_size at the ATM network. $T_{scsi}$ is the delay at the SCSI bus. Let $P_{dc}$ be the probability that the CPU does the processing during the shipping of data from the disk to cards. $P_{dc}$ is given by the product of server CPU utilization and the utilization of the maximum utilized bus amongst the EEX, PCI and SCSI-2s. Thus we have:

$$P_{dc} = \frac{N \times tdcser \times rate}{buffer\_size} \times \text{Maximum} \left( \frac{N \times rate}{du \times bw\_scsi}, \frac{N \times rate}{bw\_eex}, \frac{N \times rate}{bw\_pci} \right) \qquad (24)$$

Considering the available parallelism into account, the effective real time delay for shipping a buffer_size of data from the disk to the ATM adapter card over the SCSI-2, PCI-1 and EEX and PCI-2 buses when there are N streams is:

$$T_{dsktocard} = (1 - P_{dc}) \times T_{dcser} + 2. \times T_{dcpci} + \frac{T_{uscsifw}}{usp} \qquad (25)$$

where, tdcser and Tdcser are the CPU service time and time delay at the server associated with the shipping of data buffer. Since the data will visit the two PCI buses, the delay on PCI buses will be twice that on a single PCI bus. The delay at the EEX bus is negligible since the bandwidth of EEX bus is more than double that of the PCI bus.

Assuming buffer_size=1 MB, tdcser=0.0035 seconds, with N streams distributed over 4 ATM adapter cards, we get $P_{dc}$=0.0000663$N^2$, (usp=4). On substitution of these values in (25) we get:

$$\hat{T}_{dsktoatm} = \frac{(1 - 0.0000663N^2) \times 3.5 \times 0.001}{(1 - N \times 0.0035)} + \frac{\frac{1}{13.2}}{\left(1 - \frac{N}{4 \times 13.2}\right) \times 4} + \frac{\frac{1}{80}}{\left(1 - \frac{N}{80}\right)}$$

In order that none of the ATM cards starve, it is necessary that $\hat{T}_{dsktoatm} < 1$. That is: $0.001[3.5(1-0.000063N^2)/(1-0.0035N)+18.94/(1-0.0189N)+25/(1-0.0125N))\times 4 \leq 1$. By trial and error we get N=47 largest N satisfying all the constraints.

It will be appreciated that the DDE servers are a breed of computer systems that have the capability to handle the requirements of various data types of interest to users at large. In the preceding discussion, the performance capabilities of the AT&T Phoenix VOD server has been modeled using a processing scenario based queuing network model for both the server-centric and peer-to-peer architectures. The models take into account the possible parallel processing that occur within the processing scenario.

The model presented here essentially provides a methodology to determine the maximum number of streams of specified rate(s) that can be supported by the DDE system. In real DDE systems (where some protection against viruses and malicious users can be assumed to exist), based on the understanding of the applications used, the rates (or ranges) would be known either a priori or dynamically. A resource manager keeps an up to date view of key system resources at all times based on the current use of the system. An admission control algorithm that uses key resource utilization and availability status along with the model can decide dynamically and accurately if a new request for diverse data delivery (in this case a video strip) can be granted satisfying all the existing requests along with the new one with acceptable quality of service. For a more complete description of implementation of such an admission control system, see my cross-referenced copending patent application. The model can also be used in a sensitivity analysis and simulation study to take into account of potential hardware and software enhancements.

It will be appreciated that the various applications, programs, computer processes and other supporting software (e.g., the operating systems and interfaces) are resident at different times on one or more "program storage devices." As used herein, the term "program storage device" may include any device or apparatus capable of storing information such as data or program code either in a volatile or nonvolatile manner. Accordingly, a program storage device may comprise memory devices such as RAMs, ROMs, EPROMs, processor and cache memories, flash memories, customized integrated circuits, etc., as well as fixed or removable mass storage medias such as magnetic disks (fixed or removable), CD-ROMs, magnetic tape, etc. In addition, it will be appreciated that the various applications, programs, computer processes and other supporting software (generically "eprogram products") may be transferred or downloaded to a computer system via network or modem in lieu of being provided on a storage media such as a floppy disk or CD-ROM, typically by first establishing a connection between the computer system and a server-type computer, and thereafter transmitting the program product to the computer system. Thus, it will be appreciated that a "program storage device" may also include any of the aforementioned memory and storage media of a server-type computer (e.g., a bulletin board or ftp site) which downloads or transfers a program product to other computer systems but does not actually execute the downloaded or transferred program product.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for evaluating the performance metrics of a multimedia open server system, comprising the steps of:
   (a) creating a performance model by using a processing scenario based open queuing network technique for the multimedia open server system; and
   (b) using said performance model to calculate:
      (i) a numeric value that represents the maximum number of data streams which the multimedia open server system can support; and
      (ii) an average user command response time for the multimedia open server system, the average response time being related to the maximum number of data streams.

2. The method of claim 1, wherein the processing scenario modeled has a server-centric configuration.

3. The method of claim 1, wherein the processing scenario modeled has a peer-to-peer configuration.

4. The method of claim 1, wherein creating said performance model includes the steps of:
   (a) creating a processing scenario for a data flow stream from an upstream channel or storage subsystem of the multimedia system to a downstream NTSC port or device of the multimedia system;
   (b) identifying key resources of said multimedia system forming a part of said data flow stream; and
   (c) modeling each of said key resources to provide parameters related to said response time and to data handling capacity of said key resources.

5. The method of claim 1, wherein said performance model includes data structures and algorithms representing a complex of ordered double buffering systems and buffer management schemes for delivery of diverse data in multimedia communication systems.

6. The method of claim 1, wherein said multimedia server system is a diverse-data enabled server which includes ATM networks.

7. The method of claim 1, including the step of using said performance model to predict the maximum number of data streams the entire system can dynamically support.

8. The method of claim 1, including the step of providing the determined maximum number of data streams information to an admission control algorithm for deciding whether a new request by a client seeking access to the multimedia server should be granted.

9. The method of claim 8, including the step of applying the admission control algorithm to controlling data flow through the multimedia server system in a manner that guarantees delivery of information service to users of the multimedia system, dynamically, with no buffer overflow or starvation within the multimedia server system.

* * * * *

UNITED STATES PATENT AND TRADEMARK OFFICE
CERTIFICATE OF CORRECTION

PATENT NO. : 5,764,961

DATED : June 9, 1998

INVENTOR(S) : Kabekode V. Bhat

It is certified that error appears in the above-identified patent and that said Letters Patent is hereby corrected as shown below:

Column 11, line 33, after "client" (first occurrence), "(1)" should read --(1j)--.

Column 11, line 33, after "client" (second occurrence), "(1)" should read --(1j)--.

Column 11, line 35, after "rate", "(1)" should read --(1j)--.

Column 17, line 45, "eprogram" should read --program--.

Signed and Sealed this

Second Day of February, 1999

Attest:

Attesting Officer

*Acting Commissioner of Patents and Trademarks*